Dec. 26, 1939.   F. MOORE   2,184,358
ADJUSTING MEANS
Original Filed June 25, 1938
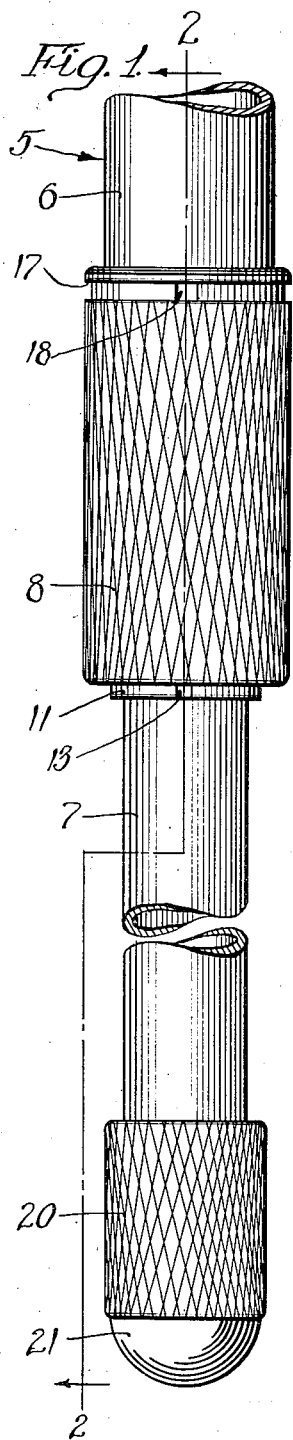
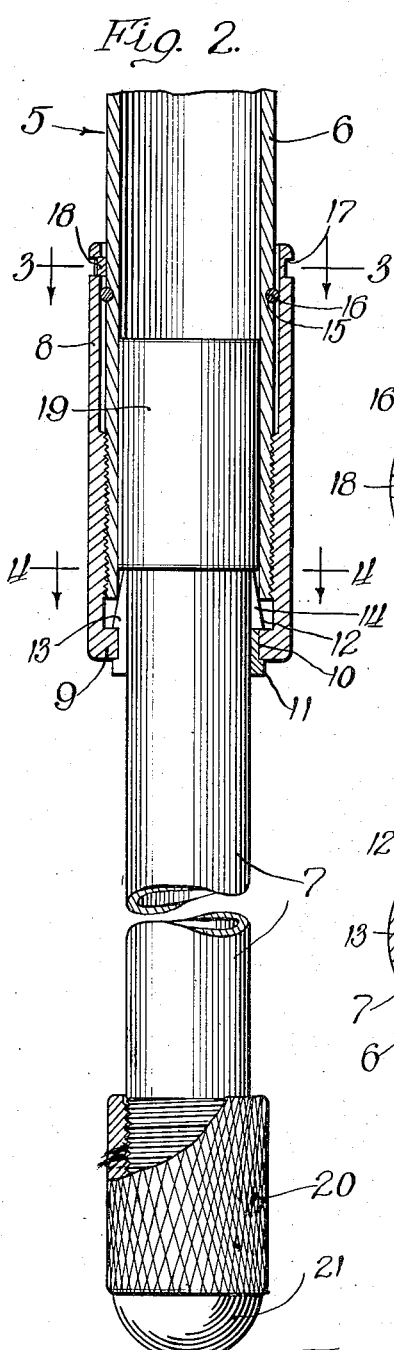
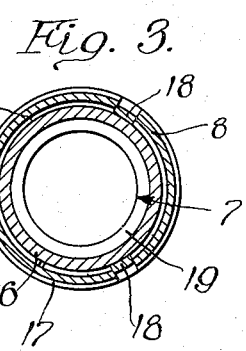
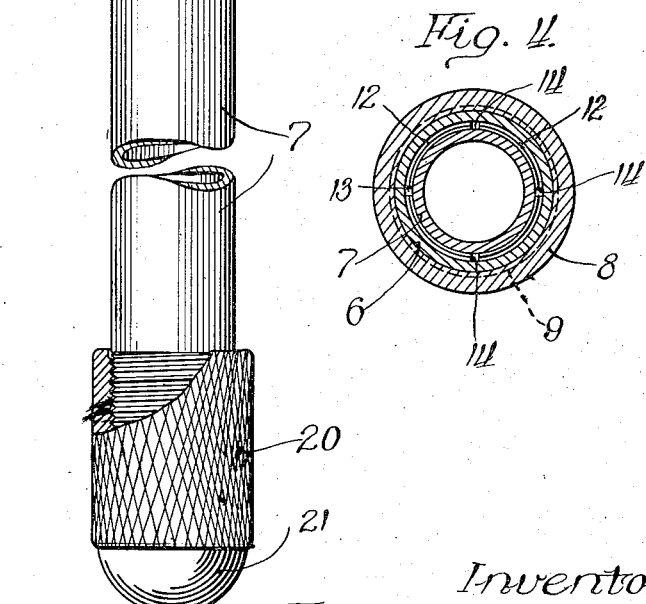
Inventor:
Francis Moore
By Brown, Jackson, Boettcher & Dienner
Attys.

Patented Dec. 26, 1939

2,184,358

UNITED STATES PATENT OFFICE 2,184,358

ADJUSTING MEANS

Francis Moore, Chicago, Ill., assignor to Albert Specialty Company, Chicago, Ill., a partnership composed of Stanley Flesch and Harold Flesch Original application June 25, 1938, Serial No. 215,778. Divided and this application March 24, 1939, Serial No. 263,850

4 Claims. (Cl. 248—191)

This invention relates to adjusting means, and has to do with means for effecting adjustment of telescopic structures such as tripod legs and analogous devices.

My invention is directed to means for locking in relative adjustment two telescoping members while permitting release and adjustment thereof with expedition and facility. More specifically, I provide a clamping member about the inner one of the two telescoping members, and screw means cooperating with the clamping member and the outer one of the two telescoping members, for contacting the clamping member, by a wedging action, tightly about the inner telescoping member. Further objects and advantages will appear from the detail description.

Figure 1 is a side view of a tripod leg of telescopic construction, partly broken away, embodying the adjusting means of my invention;

Figure 2 is a sectional view taken substantially on line 2—2 of Figure 1, certain parts being shown in elevation;

Figure 3 is a sectional view taken substantially on line 3—3 of Figure 2; and

Figure 4 is a sectional view taken substantially on line 4—4 of Figure 2.

This application is a division of my copending application for Tripod, Serial No. 215,778, filed June 25, 1938.

I have illustrated my invention, by way of example, as applied to a tripod leg 5 comprising outer and inner telescoping members 6 and 7, respectively. The lower end portion of the outer leg member 6 is exteriorly threaded, for reception of a sleeve 8 interiorly threaded from a point adjacent its lower end, for a portion of its length. At its lower end sleeve 8 is provided with an integral interior circumferential shoulder 9. Shoulder 9 engages into a circumferential groove 10 formed in the outer face of a flange 11, depending from an upwardly tapering collar 12 extending into the lower end of member 6, between the latter and member 7. This provides a loose nut connection between sleeve 8 and collar 12 effective for adjusting the latter lengthwise of leg 5, in accordance with turning of sleeve 8 on to and off of member 6. Collar 12 is provided with a lengthwise slot 13, extending the full length of the body portion of the collar and of flange 11, and is also provided with three slots 14, extending from the upper end of the collar and terminating at the upper end of flange 11. These slots facilitate contraction of the collar about leg member 7. By threading sleeve 8 onto member 6, the tapered collar is forced between the lower end of the latter member and member 7, so as to be contracted tightly about the latter, serving as a wedge effective for frictionally locking the members 6 and 7 together. By turning sleeve 8 off of member 6 sufficiently to release the pressure of collar 12 and withdraw the latter from the lower end of member 6 to a proper extent, member 7 may be slid into and out of member 6 for adjusting the effective length of the leg, after which the two leg members are locked in adjustment in the manner stated.

Leg member 6 is provided, a short distance below the upper end of collar 8, with an exterior circumferential groove 15 in which is mounted a split ring 16, which projects outward into contact with the circumferential inner surface of sleeve 8. Sleeve 8 is provided, adjacent its upper end, with a shallow exterior circumferential groove 17. The material of the sleeve 8, at the bottom or base of groove 17, is struck in to provide inwardly projecting elements 18, disposed to contact ring 16 so as to prevent complete removal of sleeve 8 from member 6. Member 7 is provided, at its upper end, with an element 19 of increased diameter, the exterior diameter of this element being greater than the interior diameter of collar 12 when the latter is relieved from pressure. Since sleeve 8 cannot be completely removed from member 6 and element 19 of member 7 cannot be withdrawn through collar 12, disassembling of the elements of the leg structure is prevented. Preferably, element 19 has a snug sliding fit within leg member 6 and cooperates therewith for guiding and bracing the leg members 6 and 7. A knurled ferrule 20 is threaded on the lower end of the leg member 7 and carries a rubber tip 21, for reducing slippage of the leg upon the supporting surface.

While I have illustrated a preferred form of my invention, by way of example, it will be understood that changes in construction and arrangement of parts thereof may be made without departing from the field and scope of the same, and I intend to include all such variations, as fall within the scope of the appended claims, in this application, in which the preferred form only of my invention has been disclosed.

I claim:

1. In a device of the character described, two telescoping members, a tapered split collar fitting between the inner member and the end of the outer member, a sleeve screwing on the end portion of said outer member and having operating connection to said collar effective for adjusting it in either direction lengthwise of said members, said inner member being provided at its inner end with a projection disposed to contact the inner end of said collar effective for preventing complete withdrawal of said inner member from said outer member, and means preventing removal of said sleeve from said outer member.

2. In a device of the character described, two telescoping members, a tapered split collar extending about the inner member and into the adjacent end of the outer member, a sleeve screwing onto the end portion of the outer member and having operating connection to said collar effective for adjusting it in either direction lengthwise of said members, the inner end portion of said inner member beyond said collar being of greater exterior diameter than the normal interior diameter of said collar and fitting snugly the interior of said outer member, and means preventing removal of said sleeve from said outer member.

3. In a device of the character described, two telescoping members, the exterior diameter of the inner member for the major portion of its length being less than the interior diameter of the outer member, the latter having its lower end portion exteriorly threaded and being provided above said threaded portion with an exterior circumferential groove, a ring mounted in said groove, an upwardly tapering split collar fitting between said inner member and the lower end of said outer member provided adjacent its lower end with an exterior circumferential groove, and a sleeve screwing on the threaded lower end portion of said outer member extending upward beyond said ring with its upper portion of increased interior diameter greater than the exterior diameter of said outer member, said sleeve being provided above said ring with an inwardly projecting abutment disposed to contact said ring and thereby limit movement of said sleeve toward the lower end of said outer member, said sleeve having an interior circumferential flange fitting into said groove of said collar for adjusting the latter in either direction, the upper end portion of said inner member being of increased diameter for an appreciable portion of its length providing a guide element fitting snugly the interior of said outer member and a shoulder disposed to contact said collar preventing complete withdrawal of said inner member through the lower end of said outer member.

4. In a device of the character described, two telescoping members, the exterior diameter of the inner member for the major portion of its length being less than the interior diameter of the outer member, the latter having its lower end portion exteriorly threaded and being provided above said threaded portion with an exterior stop member, an upwardly tapering split collar fitting between said inner member and the lower end of said outer member provided adjacent its lower end with an exterior circumferential groove, and a sleeve screwing on the lower end portion of said outer member and extending upward beyond said stop member provided above the latter with an inwardly projecting abutment disposed to contact said stop member and thereby limit movement of said sleeve toward the lower end of said outer member, said sleeve having an element extending into said groove of said collar for adjusting the latter, said inner member being provided with an element fitting the interior of said outer member for guiding said inner member and providing an abutment disposed to contact said collar preventing complete withdrawal of said inner member through the lower end of said outer member.

FRANCIS MOORE.